United States Patent
Soma et al.

(10) Patent No.: US 7,816,804 B2
(45) Date of Patent: Oct. 19, 2010

(54) POWER SUPPLY DEVICE AND CONTROL METHOD OF THE POWER SUPPLY DEVICE

(75) Inventors: Takaya Soma, Toyota (JP); Hiroshi Yoshida, Anjo (JP); Takeshi Mogari, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 246 days.

(21) Appl. No.: 12/224,342

(22) PCT Filed: Apr. 12, 2007

(86) PCT No.: PCT/JP2007/058481
§ 371 (c)(1),
(2), (4) Date: Aug. 25, 2008

(87) PCT Pub. No.: WO2007/119874
PCT Pub. Date: Oct. 25, 2007

(65) Prior Publication Data
US 2009/0039703 A1    Feb. 12, 2009

(30) Foreign Application Priority Data
Apr. 14, 2006   (JP) .............................. 2006-112408

(51) Int. Cl.
*B60L 1/00* (2006.01)
(52) U.S. Cl. .................................................. 307/10.1
(58) Field of Classification Search .................. 307/9.1, 307/10.1; 701/36, 51, 53, 101, 22; 180/271; 320/118, 116, 286; 318/440
See application file for complete search history.

(56) References Cited

U.S. PATENT DOCUMENTS

| | | | | |
|---|---|---|---|---|
| 5,859,580 A | * | 1/1999 | Hashizawa et al. | 337/260 |
| 6,668,963 B2 | * | 12/2003 | Nada | 180/279 |
| 6,900,606 B2 | * | 5/2005 | Youm | 318/375 |
| 6,930,460 B2 | * | 8/2005 | Ishikawa et al. | 318/442 |
| 7,068,010 B2 | * | 6/2006 | Youm | 318/778 |
| 7,109,605 B2 | * | 9/2006 | Habu | 307/39 |
| 7,242,109 B2 | * | 7/2007 | Beeren | 307/9.1 |
| 7,282,809 B2 | * | 10/2007 | Melis et al. | 307/9.1 |

(Continued)

FOREIGN PATENT DOCUMENTS

JP         A-04-165901         6/1992

(Continued)

*Primary Examiner*—Albert W Paladini
*Assistant Examiner*—Daniel Cavallari
(74) *Attorney, Agent, or Firm*—Oliff & Berridge, PLC

(57) ABSTRACT

A power storage device is in parallel to a battery, and is connected to a power supply line and a ground line. A service plug internally includes a resistance and is attached to the power storage device for connecting the resistance between contacts of a relay circuit. The service plug is a member independent of an ordinary service plug arranged at the power storage device. When residual charges in the power storage device are substantially zero, an operator appropriately attaches the service plug to the power storage device in place of the ordinary service plug. Accordingly, when the power storage device enters an overdischarged state due to a maintenance or the like of the power storage device, a vehicle system to which the service plug internally having a current limiting device is attached is started so that occurrence of a rush current can be prevented.

8 Claims, 6 Drawing Sheets

U.S. PATENT DOCUMENTS

| | | | |
|---|---|---|---|
| 7,468,565 B2 * | 12/2008 | Hoshiba | 307/10.1 |
| 7,505,291 B2 * | 3/2009 | Wang et al. | 363/89 |
| 2003/0137193 A1 * | 7/2003 | Belschner et al. | 307/9.1 |
| 2003/0146726 A1 * | 8/2003 | Ishikawa et al. | 318/442 |
| 2004/0027000 A1 * | 2/2004 | Beeren | 307/10.1 |
| 2004/0090807 A1 * | 5/2004 | Youm | 363/132 |
| 2004/0095784 A1 * | 5/2004 | Zhou | 363/37 |
| 2004/0119432 A1 * | 6/2004 | Youm | 318/375 |
| 2006/0071639 A1 * | 4/2006 | Ross et al. | 320/116 |
| 2006/0224360 A1 * | 10/2006 | Kishimoto | 702/183 |
| 2008/0129249 A1 * | 6/2008 | Ishishita | 320/136 |
| 2008/0143183 A1 * | 6/2008 | Hoshiba | 307/31 |

FOREIGN PATENT DOCUMENTS

| | | |
|---|---|---|
| JP | A-2000-115993 | 4/2000 |
| JP | 2001037291 A * | 2/2001 |
| JP | A-2002-175791 | 6/2002 |
| JP | A-2004-015866 | 1/2004 |
| JP | A-2004-312926 | 11/2004 |
| JP | A-2006-006048 | 1/2006 |

* cited by examiner

POWER SUPPLY DEVICE AND CONTROL METHOD OF THE POWER SUPPLY DEVICE

TECHNICAL FIELD

The present invention relates to a power supply device and a control method of the power supply device, and particularly to a power supply device that can supply an electric power from a secondary battery and a capacitor as well as a control method of the power supply device.

BACKGROUND ART

In recent years, hybrid vehicles and electric vehicles have receives attention as vehicles developed in view of environments. The hybrid vehicle uses, as drive power sources, a DC power supply, an inverter and an electric motor driven by the inverter in addition to a conventional engine. More specifically, the engine is driven to provide the drive power source, and further the inverter converts a DC voltage provided from the DC power supply into an AC voltage for driving the motor by the converted AC motor to provide the drive power source.

The electric vehicle uses, as drive power sources, a DC power supply and an inverter as well as an electric motor driven by the inverter.

For appropriately driving the vehicle and improving energy efficiency, the hybrid vehicle or the electric vehicle described above is required to supply an electric power corresponding to a load to the motor and to recover energy efficiently in a regenerative operation.

For satisfying the above requirements, e.g., Japanese Patent Laying-Open No. 2004-15866 has disclosed a hybrid vehicle in which an electric power source of an electric motor is formed of a power storage device including a secondary battery and a capacitor connected in parallel.

This structure controls charge/discharge of the power storage device to attain its residual capacity that maximizes a quantity of generated heat of the secondary battery. Therefore, even when the power storage device is to be charged with a constant electric power, the temperature of the secondary battery can be rapidly increased to improve a dischargeable output and a chargeable input of the power storage device.

Further, Japanese Patent Laying-Open No. 2004-312926 has disclosed a control device of a vehicle for driving an electric motor by supplying an electric power from a capacitor or via an electric power converter circuit from a secondary battery.

The above control device of the vehicle includes control means for controlling an operation of an electric power converter circuit according to a state of a load on the electric motor. When the control means does not operate the electric power converter circuit according to the state of the load, the capacitor can supply the electric power to the electric motor. Therefore, an energy loss does not occur in the electric power converter circuit, and fuel consumption can be improved. When the control means operates the electric power converter circuit, the secondary battery can supply the electric power so that the electric motor can generate a sufficient drive power for driving the vehicle, and lowering of the vehicle drive performance can be prevented.

In the control device of the vehicle that is provided with the capacitor and the secondary battery as the power supply sources for the electric motor as described in the above patent documents, electric charges remaining in the capacitor may be discharged after a vehicle system stops. For example, in a maintenance operation of the power supply device, the charges remaining in the capacitor are discharged before performing the maintenance for ensuring operation safety.

Therefore, in a next start operation of the vehicle system, the capacitor is in an overdischarged state, and will be charged by the battery when the converter operates when a driver turns on an ignition.

In the above state, however, the voltage of the capacitor is substantially zero so that an excessive current (i.e., rush current) may flow into a capacitor due to a voltage difference with respect to the battery. This rush current may internally overheat and damage the capacitor, and may weld a relay employed for connecting the capacitor to a power supply line. This results in a problem that the vehicle system cannot be started up immediately after the discharge of the capacitor, in view of generation of the above rush current.

For avoiding the rush current, it is effective to arrange a current limiting device for controlling a charge/discharge current of the capacitor. The current limiting device may be a resistance or a reactor.

In the control device of the vehicle using the capacitor of a large capacity as the electric power source, however, the capacitor itself has a high output density so that the current limiting device for it must have a high impedance and large sizes. This may increase the sizes of the device.

Accordingly, the invention has been made for overcoming the above problems, and an object thereof is to provide a power supply device that can be implemented by a small device structure with high safety as well as a control method of the power supply device.

DISCLOSURE OF THE INVENTION

According to the invention, a power supply device includes a power supply capable of supplying an electric power to a power supply line; a drive circuit arranged between the power supply line and a motor for driving and controlling the motor; a power storage device connected to the power supply line and arranged in parallel to the power supply; a switch device electrically connecting the power storage device to the power supply line in a closed state; and a control device controlling an open/close operation of the switch device. The power storage device includes a relay circuit arranged to be connected in series to the switch device on a current path being formed of the power supply line and the power storage device when the switch device is closed, and a first connection member being externally removable, being attached to the relay circuit for connecting contacts of the relay circuit together via a resistance element, and being removed from the relay circuit for disconnecting the contacts of the relay circuit from each other. The control device closes the switch device in response to attachment of the first connection member to the relay circuit when a power supply voltage of the power storage device is equal to or lower than a predetermined threshold.

In the above power supply device, a current limiting of the power storage device is arranged by employing the first connection member that is externally removably attached so that occurrence of the rush current can be prevented by the device structure smaller than that of a power supply device that is permanently and internally provided with a current limiting device.

Preferably, the power storage device further includes a second connection member being externally removable, being attached to the relay circuit for directly connecting the contacts of the relay circuit together, and being removed from the relay circuit for disconnecting the contacts of the relay circuit from each other. The first connection member is attached to the relay circuit after the second connection member is removed from the relay circuit when the power supply voltage of the power storage device is equal to or lower than the predetermined threshold. The second connection member is attached to the relay circuit after removal of the first connection member from the relay circuit when the power supply voltage of the power storage device substantially becomes equal to a voltage on the power supply line in response to closing of the switch device.

According to the above power supply device, when the power supply voltage of the power storage device is equal to or lower than the predetermined threshold, the ordinary second connection member is replaced with the first connection member internally including the current limiting device. Therefore, the occurrence of the rush current can be reliably prevented by the small device structure.

Preferably, the control device includes a determining unit determining whether the first connection member is attached to the relay circuit or not. The determining unit includes a charge request detecting unit detecting external designation of a charge request for the power storage device, and a relay circuit detecting unit detecting connection/disconnection between the contacts of the relay circuit. The determining unit determines that the first connection member is attached to the relay circuit, when the designation of the charge request for the power storage device is detected and the connection between the contacts of the relay circuit is detected.

The power supply device described above can reliably determine the installation of the current limiting device in the power storage device.

Preferably, the power storage device further includes a switch circuit attaining a closed state in response to attachment of the first connection member to the relay circuit. The control device includes a determining unit determining whether the first connection member is attached to the relay circuit or not. The determining unit determines that the first connection member is attached to the relay circuit, when the switch circuit is closed.

The power supply device described above can reliably determine the installation of the current limiting device in the power storage device.

According to another aspect the invention, a control method of a power supply device controls the power supply device supplying an electric power to a power supply line. The power supply device includes a power supply capable of supplying an electric power to a power supply line, a drive circuit arranged between the power supply line and a motor for driving and controlling the motor, a power storage device connected to the power supply line and arranged in parallel to the power supply, and a switch device capable of attaining a closed state for electrically connecting the power storage device to the power supply line. The power storage device includes a relay circuit arranged to be connected in series to the switch device on a current path being formed of the power supply line and the power storage when the switch device is closed. The control method of the power supply device includes a relay circuit control step of connecting contacts of the relay circuit together via a resistance element in response to attachment of the first connection member to the relay circuit; and a switch control step of closing the switch device in response to the attachment of the first connection member to the relay circuit when a power supply voltage of the power storage device is equal to or lower than a predetermined threshold.

In the above control method of the power supply device, a current limiting of the power storage device is arranged by employing the first connection member that is externally removably attached so that occurrence of the rush current can be prevented by the device structure smaller than that of a power supply device that is permanently and internally provided with a current limiting device.

Preferably, the relay circuit control step includes the steps of disconnecting the contacts of the relay circuit from each other in response to removable of the second connection member from the relay circuit when the power supply voltage of the power storage device is equal to or lower than the predetermined threshold; connecting the contacts of the relay circuit together via the resistance element in response to attachment of the first connection member to the relay circuit after the second connection member is removed from the relay circuit; disconnecting the contacts of the relay circuit from each other in response to removal of the first connection member from the relay circuit when the power supply voltage of the power storage device substantially becomes equal to a voltage on the power supply line in response to closing of the switch device; and directly connecting the contacts of the relay circuit together in response to attachment of the second connection member to the relay circuit after the first connection member is removed from the relay circuit.

According to the above control method of the power supply device, when the power supply voltage of the power storage device is equal to or lower than the predetermined threshold, the ordinary second connection member is replaced with the first connection member internally including the current limiting device. Therefore, the occurrence of the rush current can be reliably prevented by the small device structure.

Preferably, the switch control step includes a determining step of determining whether the first connection member is attached to the relay circuit or not. The determining step includes a charge request detecting step of detecting external designation of a charge request for the power storage device, a relay circuit detecting step of detecting connection/disconnection between the contacts of the relay circuit, and a step of determining that the first connection member is attached to the relay circuit when the designation for the power storage device is detected and the connection between the contacts of the relay circuit is detected.

The control method of the power supply device described above can reliably determine the installation of the current limiting device in the power storage device.

Preferably, the power storage device further includes a switch circuit attaining a closed state in response to attachment of the first connection member to the relay circuit. The switch control step includes a determining step of determining whether the first connection member is attached to the relay circuit or not. The determining step determines that the first connection member is attached to the relay circuit, when the switch circuit is closed.

The control method of the power supply device described above can reliably determine the installation of the current limiting device in the power storage device.

According to the invention, occurrence of the rush current can be prevented by a small device structure in the power supply device that has the power storage device and the power supply that can supply the electric power to the first and second power supply lines.

BEST MODES FOR CARRYING OUT THE INVENTION

Embodiments of the invention will now be described with reference to the drawings. In the following description, the same or corresponding portions bear the same reference numbers, and description thereof is not repeated.

Figure 1:
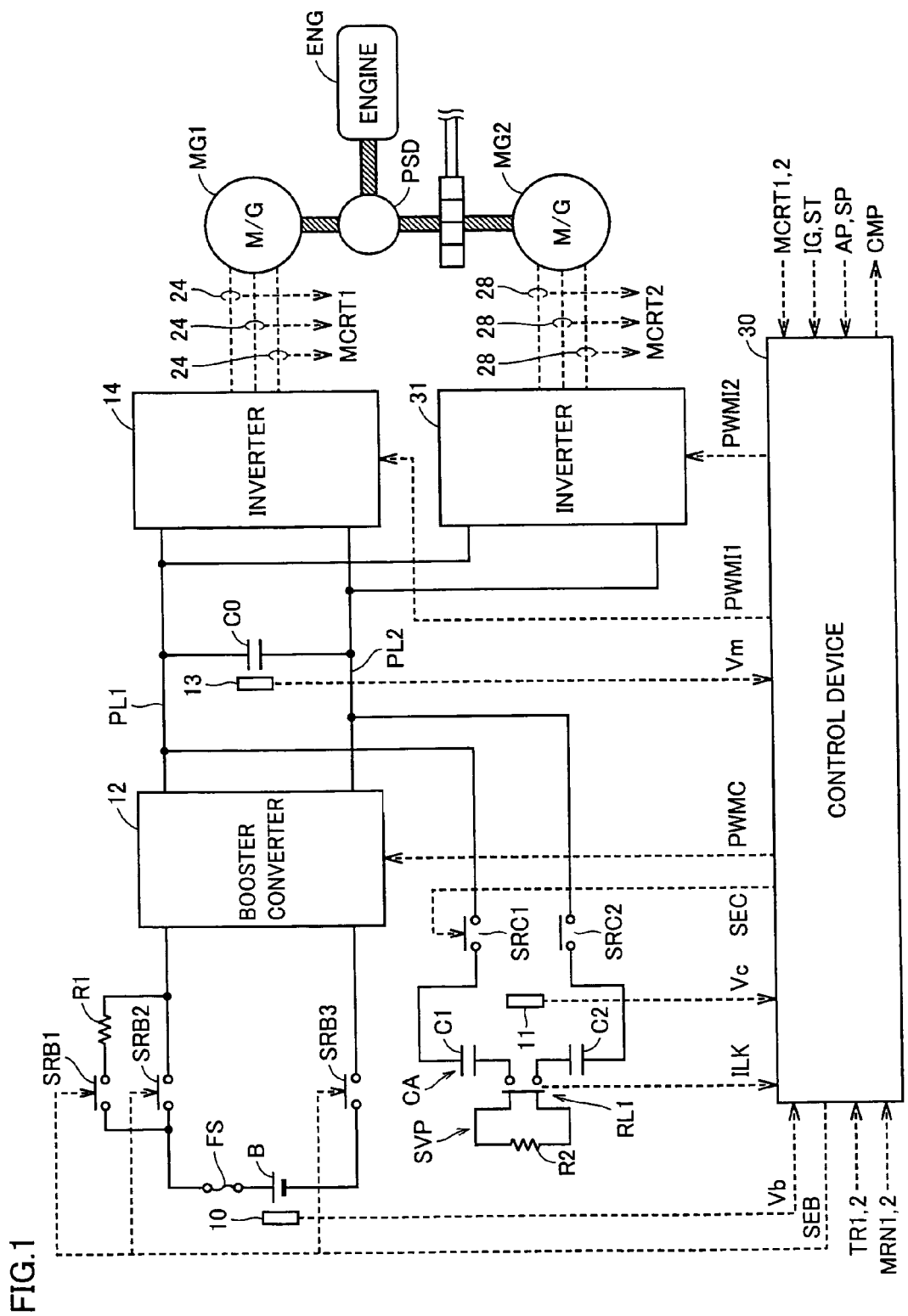
FIG. 1 is a schematic block diagram of a motor drive device employing a power supply device according to an embodiment of the invention.

FIG. 1 is a schematic block diagram of a motor drive device employing a power supply device of an embodiment of the invention.

Referring to FIG. 1, a motor drive device includes a battery B, a booster converter 12, a power storage device CA, a capacitor C0, inverters 14 and 31, voltage sensors 10, 11 and 13, current sensors 24 and 28, system relays SRB1-SRB3, SRC1 and SRC2, a resistance R1 and a control device 30.

An engine ENG generates a drive power from combustion energy of a fuel such as gasoline. The drive power generated by engine ENG is split by a power splitting mechanism PSD for two paths hatched by thick lines in FIG. 1. One of the paths transmits the power to a drive shaft driving wheels via a speed reducer (not shown). The other path transmits the power to motor generator MG1, Each of motor generators MG1 and MG2 can operate as a power generator and an electric motor. However, motor generator MG1 primarily operates as a power generator, and motor generator MG2 primarily operates as an electric motor.

More specifically, motor generator MG1 is a three-phase AC rotator, and is used as a starter for starting engine ENG in an accelerating operation. In this operation, motor generator MG1 receives the electric power from battery B and operates as the electric motor to crank engine ENG.

After engine ENG starts, motor generator MG1 is rotated by the drive power of engine ENG transmitted via power splitting mechanism PSD.

The electric power generated by motor generator MG1 is used in a manner depending on a drive state of the vehicle and a stored electric energy of power storage device CA. For example, during normal running or rapid acceleration, the electric power generated by motor generator MG1 is used as the electric power for driving motor generator MG2, as it is. When the stored energy of power storage device CA is lower than a predetermined value, the electric power generated by motor generator MG1 is converted from an AC power to a DC power by inverter 14, and is stored in power storage device CA.

Motor generator MG2 is a three-phase AC rotator, and is driven by at least one of the electric power stored in power storage device CA and the electric power generated by motor generator MG1. The drive power of motor generator MG2 is transmitted to the drive shaft of the wheels via the speed reducer. Thereby, motor generator MG2 assists engine ENG to drive the vehicle, or drives the vehicle only by its own drive power.

In a regenerative braking operation of the vehicle, motor generator MG2 is driven by the wheels via the speed reducer, and thereby operates as an electric power generator. In this operation, the regenerative electric power generated by motor generator MG2 is supplied to power storage device CA via inverter 31 for charging it.

Battery B is formed of a secondary battery such as a nickel hydrogen battery or a lithium ion battery. Also, battery B may be a fuel cell. A fuse element FS is arranged in series with respect to battery B, and cooperates with a service plug (not shown) to form a circuit open/close device for interrupting a high-voltage circuit. Voltage sensor 10 detects a DC voltage Vb output from battery B, and provides detected DC voltage Vb to control device 30.

System relay SRB1 and resistance R1 are connected in series between a positive electrode of battery B and booster converter 12. System relay SRB2 is connected between the positive of battery B and booster converter 12, and is arranged in parallel to system relay SRB1 and resistance R1. System relay SRB3 is connected between a negative electrode of battery B and booster converter 12.

System relays SRB1-SRB3 are turned on/off by a signal SEB provided from control device 30. More specifically, system relays SRB1-SRB3 are turned on by signal SEB at an H-level (logical high) provided from control device 30, and is turned off by signal SEB at an L-level (logical low) provided from control device 30.

Booster converter 12 boosts DC voltage Vb supplied from battery B to an arbitrary level, and supplies the boosted voltage to capacitor C0. More specifically, when booster converter 12 receives a signal PWMC from control device 30, it supplies DC voltage Vb boosted according to signal PWMC to capacitor C0. When booster converter 30 receives signal PWMC from control device 30, it steps down the DC voltage supplied from inverter(s) 14 and/or 31 via capacitor C0, and charges battery B with it.

Power storage device CA is connected to a power supply line PL1 and a ground line PL2 and is arranged in parallel to battery B. Power storage device CA includes capacitors C1 and C2 connected together in series. Capacitors C1 and C2 are formed of electrical double layer capacitors, respectively. Voltage sensor 11 detects a voltage (which may also be referred to as an "inter-terminal voltage" hereinafter) Vc between opposite terminals of power storage device CA, and provides it to control device 30.

In this invention, a service plug SVP internally having a resistance R2 is attached to power storage device CA so that power storage device CA is electrically connected to power supply lines PL1 and PL2 via resistance R2.

System relay SRC1 is connected between power supply line PL1 and capacitor C1. System relay SRC2 is connected between ground line PL2 and a negative terminal of capacitor C2. System relays SRC1 and SRC2 are turned on/off according to a signal SEC provided from control device 30. More specifically, system relays SRC1 and SRC2 are turned on by signal SEC at the H-level provided from control device 30, and are turned off by signal SEC at the L-level provided from control device 30.

Capacitor C0 smoothes the DC voltage boosted by booster converter 12, and supplies the smoothed DC voltage to inverters 14 and 31. Voltage sensor 13 senses a voltage Vm (corresponding to the input voltages of inverters 14 and 31) between the opposite ends of capacitor C0, and provides sensed voltage Vm to control device 30.

When inverter 14 is supplied with the DC voltage from booster converter 12 or power storage device CA via capacitor C0, inverter 14 converts, the DC voltage into a three-phase AC voltage based on a control signal PWMI1 provided from control device 30, and drives motor generator MG1. Thereby, motor generator MG1 is driven to generate a torque indicated by a torque command value TR1.

In a regenerative braking operation of the hybrid vehicle equipped with the motor drive device, inverter 14 converts the AC voltage generated by motor generator MG1 into the DC voltage based on signal PWMI1 provided from control device 30, and supplies the converted DC voltage to power storage device CA or booster converter 12 via capacitor C0. The regenerative braking in this description includes braking that is performed together with regenerative power generation in response to a foot brake operation by a driver of the hybrid vehicle, and also includes deceleration (or stop of acceleration) of the vehicle that is performed together with the regenerative power generation in response to releasing of an accelerator pedal during running.

When inverter 31 is supplied with the DC voltage from booster converter 12 or capacitor C1 via capacitor C0, inverter 31 converts the DC voltage into the AC voltage based on a control signal PWMI2 provided from control device 30, and drives motor generator MG2. Thereby, motor generator MG2 is driven to generate the torque designated by a torque command value TR2.

In the regenerative braking operation of the hybrid vehicle equipped with the motor drive device, inverter 31 converts the AC voltage generated by motor generator MG2 into the DC voltage based on signal PWMI2 provided from control device 30, and supplies the converted DC voltage to power storage device CA or booster converter 12 via capacitor C0.

Current sensor 24 senses a motor current MCRT1 flowing through motor generator MG1, and provides sensed motor current MCRT1 to control device 30. Current sensor 28 senses a motor current MCRT2 flowing through motor generator MG2, and provides sensed motor current MCRT2 to control device 30.

Control device 30 receives torque command values TR1 and TR2 as well as motor revolution speeds MRN1 and MRN2 from an external ECU (Electronic Control Unit) that is not shown, receives signals IG and ST from an ignition key (not shown), receives an accelerator pedal position AP from an accelerator position sensor (not shown) and receives a shift position SP from a shift position sensor (not shown). Each of signals IG and ST selectively attains the H- and L-levels.

Further, control device 30 receives DC voltage Vb from voltage sensor 10, receives inter-terminal voltage Vc of power storage device CA from voltage sensor 11, receives voltage Vm from voltage sensor 13, receives motor current MCRT1 from current sensor 24 and motor current MCRT2 from current sensor 28.

Based on input voltage Vm of inverter 14, torque command value TRI and motor current MCRT1, control device 30 produces signal PWMI1 for performing switching control on the IGBT element (not shown) of inverter 14 when inverter 14 drives motor generator MG1, and provides produced signal PWM1 to inverter 14.

Based on input voltage Vm of inverter 31, torque command value TR2 and motor current MCRT2, control device 30 also produces signal PWMI2 for performing the switching control on the IGBT element (not shown) of inverter 31 when inverter 31 drives motor generator MG2, and provides produced signal PWMI2 to inverter 31.

Further, when inverter 14 drives motor generator MG1, control device 30 produces signal PWMC for performing the switching control on the IGBT element (not shown) of booster converter 12 based on DC voltage Vb of battery B, input voltage Vm of inverter 14, torque command value TR1 and motor revolution speed MRN1, and provides produced signal PWMC to booster converter 12.

When inverter 31 drives motor generator MG2, control device 30 produces signal PWMC for performing the switching control on the IGBT element (not shown) of booster converter 12 based on DC voltage Vb of battery B, input voltage Vm of inverter 31, torque command value TR2 and motor revolution speed MRN2, and provides produced signal PWMC to booster converter 12.

Further, in the regenerative braking operation of the hybrid vehicle equipped with the motor drive device, control device 30 produces signal PWMI2 for converting the AC voltage generated by motor generator MG2 into the DC voltage based on input voltage Vm of inverter 31, torque command value TR2 and motor revolution speed MRN2, and provides produced signal PWMI2 to inverter 31.

As described above, the motor drive device according to the invention uses the electric power stored in power storage device CA in addition to the electric power stored in battery B as the electric power required for driving motor generators MG1 and MG2 in a power running mode. Also, the motor drive device charges battery B and power storage device CA with the electric power generated by driving motor generators MG1 and MG2 in the regenerative mode. Particularly, the electrical double layer capacitors of large capacities are employed as capacitors C1 and C2 forming power storage device CA so that the electric power can be rapidly supplied to motor generators MG1 and MG2, and the response during the motor driving can be increased. Consequently, the running performance of the vehicle can be ensured.

In the motor drive device equipped with the electrical double layer capacitor, a rush current may occur due to a voltage difference between inter-terminal voltage Vc of power storage device CA and a system voltage (corresponding to voltage Vm between power supply line PL1 and ground line PL2).

For example, in a maintenance operation of the power supply device, inspection and maintenance may be performed after discharging the charges remaining in capacitors C1 and C2 of power storage device CA for ensuring operation safety. Therefore, when the inspection and maintenance are completed, both capacitors C1 and C2 are in an overdischarged state, and inter-terminal voltage Vc of power storage device CA is substantially zero.

Accordingly, when system relays SRC1 and SRC2 are turned on to start up the vehicle system in an ordinary manner after the end of the maintenance, an excessively large rush current may pass through power storage device CA according to the voltage difference between inter-terminal voltage Vc of power storage device CA and system voltage Vm. This passage of the rush current may overheat and damage capacitors C1 and C2. Also, it may weld the contacts of system relays SRC1 and SRC2. Under present circumstances, therefore, there is a problem that the vehicle system cannot be started immediately after the inspection and maintenance of power storage device CA.

As an example of countermeasures for avoiding the rush current due to the overdischarge of power storage device CA, resistance R1 arranged in series with respect to system relay SRB1 on the positive side of battery B may be configured to serve as a current limiting device that limits the charge/discharge current of power storage device CA. In this configuration, the vehicle system is started with system relays SRB1 and SRB3 kept on so that resistance R1 limits the rush current rushing into power storage device CA.

In another example, system relays SRC1 and SRC2 on the power storage device CA side may have substantially the same configuration as system relays SRB1-SRB3 and resistance R1 on the battery B side. According to this configuration, the resistance arranged in series with respect to system relay SRC1 limits the rush current.

However, this configuration requires the resistance having a high impedance and large sizes due to a high output density of power storage device CA itself, and therefore increases the sizes of the power supply device. Further, in the latter configuration employing the resistance for the system relay on power storage device CA side, further increase in size of the device cannot be avoided due to addition of the system relay.

Accordingly, the power supply device according to the invention has such a distinctive configuration that resistance R2 serving as the limiting device for limiting the charge/discharge current of power storage device CA is arranged in externally removable service plug SVP.

According to this configuration, service plug SVP is a member independent of an ordinary safety plug that is arranged for isolating power storage device CA from the power supply device, as will be described later. When the residual charges in power storage device CA are substantially zero, an operator appropriately replaces the ordinary safety plug in power storage device CA with service plug SVP when the residual charges in power storage device CA are substantially zero. Consequently, it is possible to suppress increase in size of the device in contrast to the structure having the current limiting device inside the power supply device.

More specifically, the power supply device shown in FIG. 1 further includes a relay circuit RL1 connected in series to power storage device CA, and service plug SVP for turning on/off relay circuit RL1.

Relay circuit RL1 is arranged in a position intermediate between capacitors C1 and C2. Relay circuit RL1 is turned off when service plug SVP is removed therefrom. Thereby, power storage device CA is cut off at this intermediate position from power supply line PL1 and ground line PL2.

When service plug SVP is attached to relay circuit RL1, it is turned on. This electrically connects power storage device CA to power supply line PL1 and ground line PL2.

Service plug SVP includes internal resistance R2. As shown in FIG. 1, when service plug SVP is attached, resistance R2 is connected between contacts of relay circuit RL1. Thereby, when service plug SVP is connected, capacitors C1 and C2 are connected in series between power supply line PL1 and ground line PL2 via resistance R2. Thus, resistance R2 forms the current limiting device of power storage device CA.

Therefore, when capacitors C1 and C2 enter the overdischarged state due to the maintenance or the like of power storage device CA, the vehicle system to which service plug SVP internally having the current limiting device is attached is started so that the occurrence of the rush current can be prevented.

Figure 2:
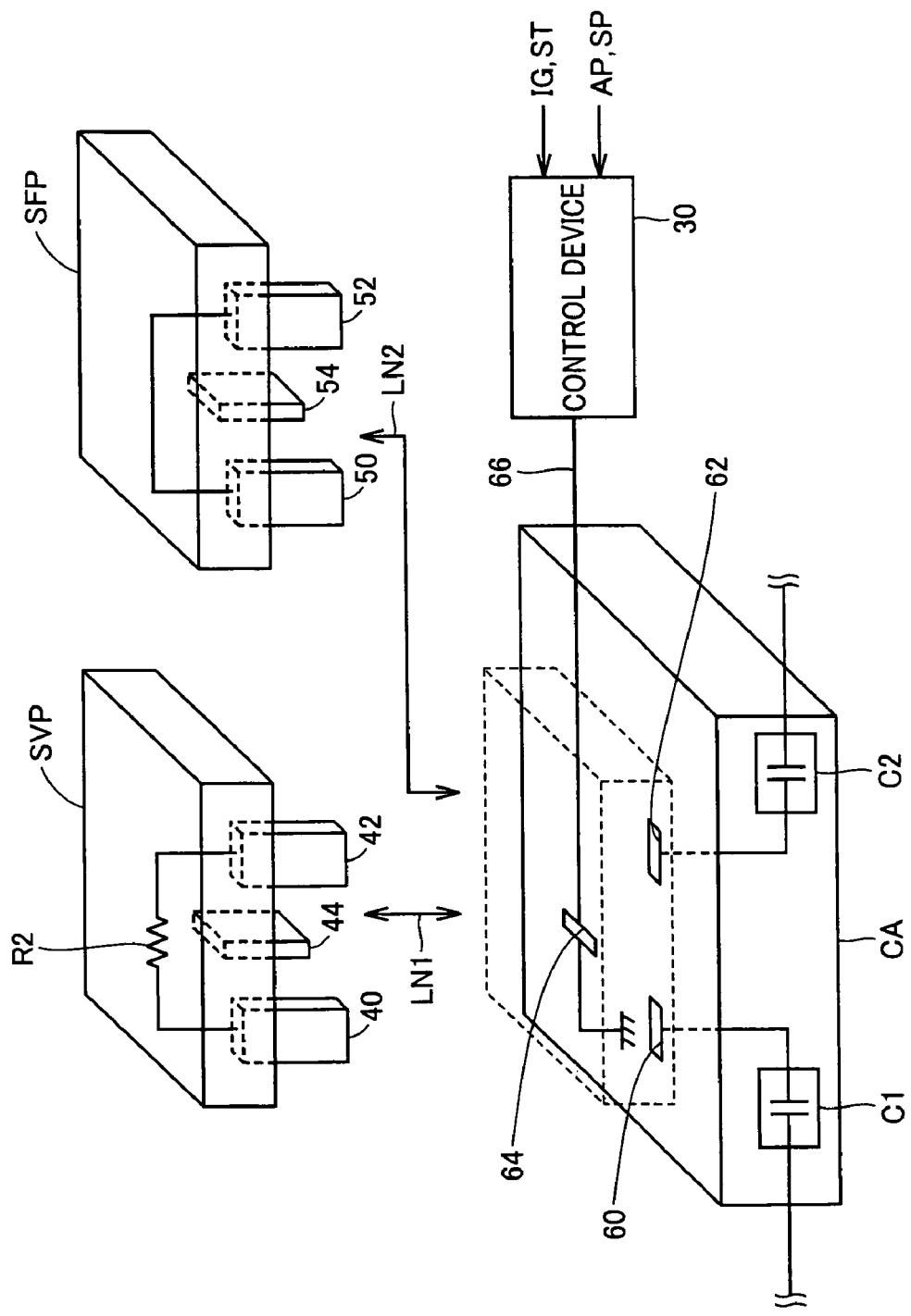
FIG. 2 illustrates a specific structure of a service plug in FIG. 1.

FIG. 2 illustrates a specific structure of service plug SVP in FIG. 1.

Referring to FIG. 2, service plug SVP has three plug terminals 40, 42 and 44 protruding from a support member as well as resistance R2.

Plug terminals 40, 42 and 44 are made of conductors, respectively. Plug terminals 40 and 42 are electrically connected together via resistance R2 arranged inside the support member.

Socket units 60 and 62 corresponding to plug terminals 40 and 42, respectively, as well as a socket unit 64 corresponding to plug terminal 44 are arranged on an outer surface of a casing of power storage device CA accommodating capacitors C1 and C2.

Socket unit 60 is electrically connected to a negative terminal of capacitor C1 inside the casing. Socket unit 62 is electrically connected to a positive terminal of capacitor C2 inside the casing. Socket units 60 and 62 form the contacts of relay circuit RL1 in FIG. 1, respectively. Therefore, when service plug SVP is attached to power storage device CA in a manner indicated by an arrow LN1 in FIG. 2, plug terminals 40 and 42 are fitted to socket units 60 and 62 to close relay circuit RL1, respectively. At this time, resistance R2 is connected between the contacts of relay circuit RL1.

Further, power storage device CA is provided on the outer surface of the casing with socket unit 64 corresponding to plug terminal 44. Socket unit 64 forms a switch circuit arranged on a signal line 66 connecting control device 30 to the ground potential. The switch circuit is turned on in response to the fitting of plug terminal 44 to socket unit 64. When the switch circuit is on, control device 30 receives a signal ILK at the H-level indicating that signal line 66 is connected to the ground potential. In this invention, signal ILK forms a signal indicating that the plug is attached to power storage device CA, and attains the H-level in response to the attachment of service plug SVP or a safety plug SFP to be described later.

As described above, when plug terminals 40, 42 and 44 are fitted to socket units 60, 62 and 64, respectively, relay circuit RL1 is turned on between the contacts with resistance R2 interposed therebetween, and control device 30 receives signal ILK at the H-level.

In addition to service plug SVP already described, the power supply device is usually provided with safety plug SFP for electrically connecting and disconnecting power supply line PL1 and ground line PL2 to/from power storage device CA.

As shown in FIG. 2, safety plug SFP has substantially the same form as service plug SVP, and has three plug terminals 50, 52 and 54 protruding from the support member. Plug terminals 50 and 52 are formed of conductors electrically connected together. However, foregoing resistance R2 is not connected between plug terminals 50 and 52.

Accordingly, when plug terminals 50, 52 and 54 are fitted to socket units 60, 62 and 64 in a direction of an arrow LN2 in FIG. 2, respectively, a path between the contacts is closed to turn on relay circuit RL1, and control device 30 receives signal ILK via communication line 66.

For example, when inspection, maintenance or the like is to be performed on power storage device CA, an operation is first performed to discharge the residual charges from capacitors C1 and C2 with safety plug SFP attached to the device. The operation for the maintenance of the like is performed after substantially setting inter-terminal voltage Vc of power storage device CA to zero. After the operation, the operator removes safety plug SFP from socket units 60, 62 and 64 arranged at the outer surface of the casing of power storage device CA, and fits service plug SVP to socket units 60, 62 and 64.

Control device 30 receives signal ILK at the H-level from power storage device CA, receives signals IG and ST from the ignition key and receives accelerator pedal position AP and shift position SP from an accelerator position sensor and a shift position sensor, respectively.

When control device 30 receives signal IG at the H-level in response to turn-on of the ignition key, control device 30 determines whether a capacitor charge mode for designating the charge request for power storage device CA is selected by the operator in a manner to be described later or not, based on signal ILK, accelerator pedal position AP and shift position SP. When it is determined that the capacitor charge mode is selected, control device 30 allows start of the vehicle system.

More specifically, control device 30 provides signal SEB at the H-level to system relays SRB1-SRB3 on the battery B side in the manner to be described later, and thereby turns on system relays SRB1-SRB3. Further, control device 30 provides signal SEC at the H-level to system relays SRC1 and SRC2 on the power storage device CA side, and turns on system relays SRC1 and SRC2. Thereby, power storage device CA is electrically connected to power supply line PL1 and ground line PL2, and enters a state that allows reception of the electric power supplied to power supply line PL1 and ground line PL2.

When signal ST attains the H-level in response to the turn of the ignition key to a start position, motor generator MG1 receiving the electric power from battery B operates as the electric motor to crank engine ENG. Power storage device CA is charged with DC voltage Vb boosted by booster converter 12. After the start of engine ENG, inverter 14 converts the AC power generated by motor generator MG1 to the DC power, which is then stored in power storage device CA.

When it is determined that the capacitor charge mode is not selected, control device 30 inhibits the start of the vehicle system. The purpose of this is to prevent occurrence of the rush current due to the start of the vehicle system in the case where the operator does not request the charging of power storage device CA or in the case where the operator requests the charging but service plug SVP is not attached to the device.

Figure 3:
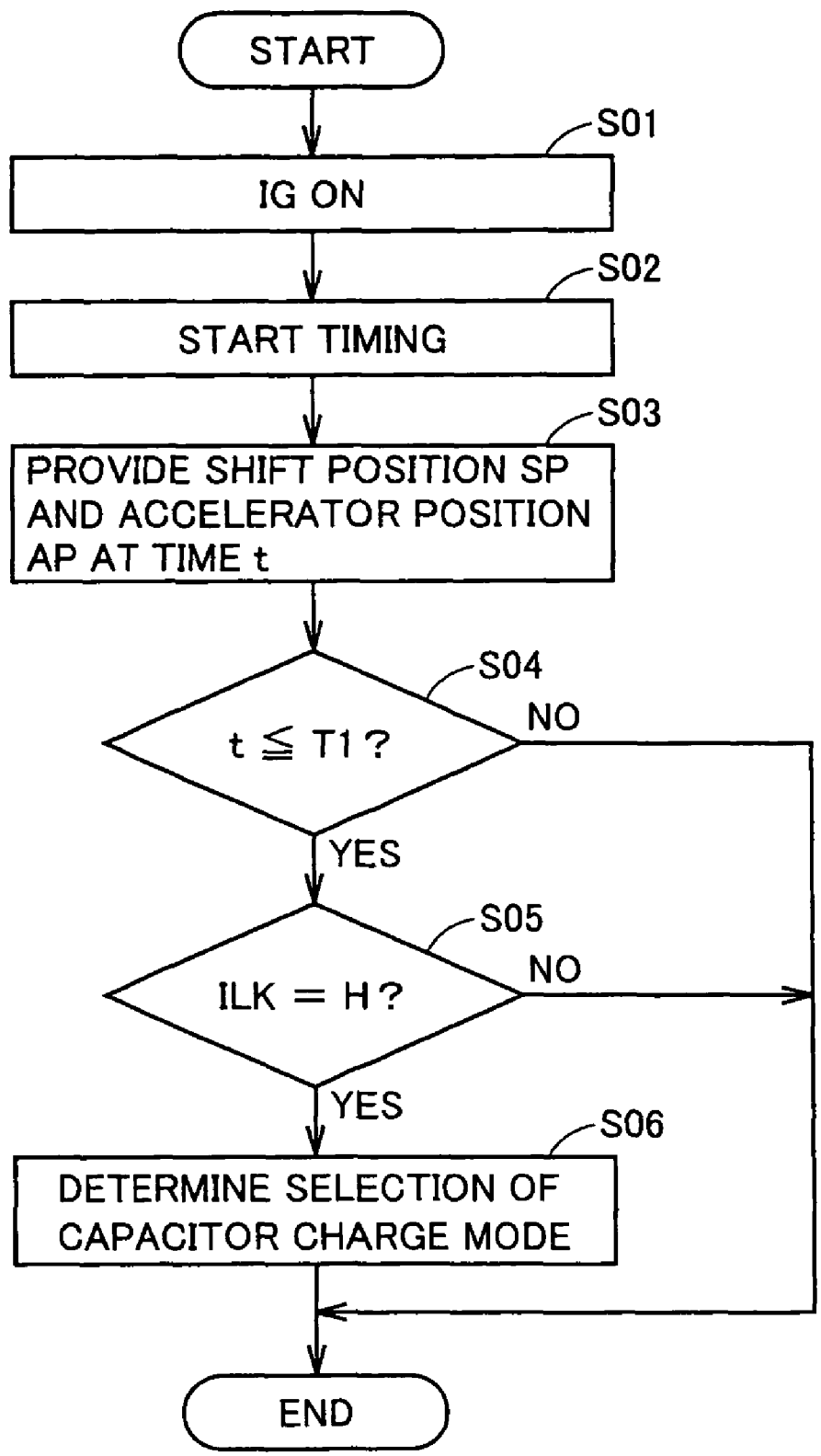
FIG. 3 is a flowchart for illustrating an operation of determining whether a capacitor charge mode is selected in a control device in FIG. 2 or not.

FIG. 3 is a flowchart for illustrating the operation of determining whether the capacitor charge mode is selected in control device 30 in FIG. 2 or not.

Referring to FIG. 3, in response to the turn-on of the ignition key (step S01), control device 30 first performs a timing operation starting from the time (t=0) when signal IG attains the H-level (step S02).

When control device 30 receives shift position SP and accelerator pedal position AP at time t (step S03), it determines whether each position is the predetermined position or not. The predetermined positions are set in advance as means for designating the capacitor charge mode by the operator.

When shift position SP and accelerator pedal position AP are the predetermined positions, respectively, control device 30 measures a period t from the turn-on of the ignition key to the reception of shift position SP and accelerator pedal position AP. Control device 30 determines whether measured period t is equal to or lower than a predetermined threshold T1 or not (step S04).

When it is determined in step S04 that period t is equal to or lower than predetermined threshold T1, i.e., that shift position SP and accelerator pedal position AP attain the predetermined positions within predetermined period T1 after the turn-on of the ignition key, respectively, control device 30 further determines whether signal ILK is at the H-level or not (step S05).

When it is determined in step S05 that signal ILK is at the H-level, i.e., that the plug is attached to power storage device CA, control device 30 determines that the capacitor charge mode is selected (step S06).

However, when it is determined in step S04 that period t exceeds predetermined threshold T1, or when it is determined in step S05 that signal ILK is at the L-level, control device 30 determines that the capacitor charge mode is not selected.

As described above, control device 30 determines that the capacitor charge mode is selected, in response to the fact that the capacitor charge mode is designated according to the operator's operation and the plug is mechanically attached to power storage device CA. In the operator's operation, the time limit is set for the period from the turn-on of the ignition key to the input of shift position SP and accelerator pedal position AP as described above, and the purpose of this time limit is to avoid such a situation that the capacitor charge mode is erroneously designated due to setting of shift position SP and accelerator position AP to the predetermined positions during ordinary start of the vehicle system.

Figure 4:
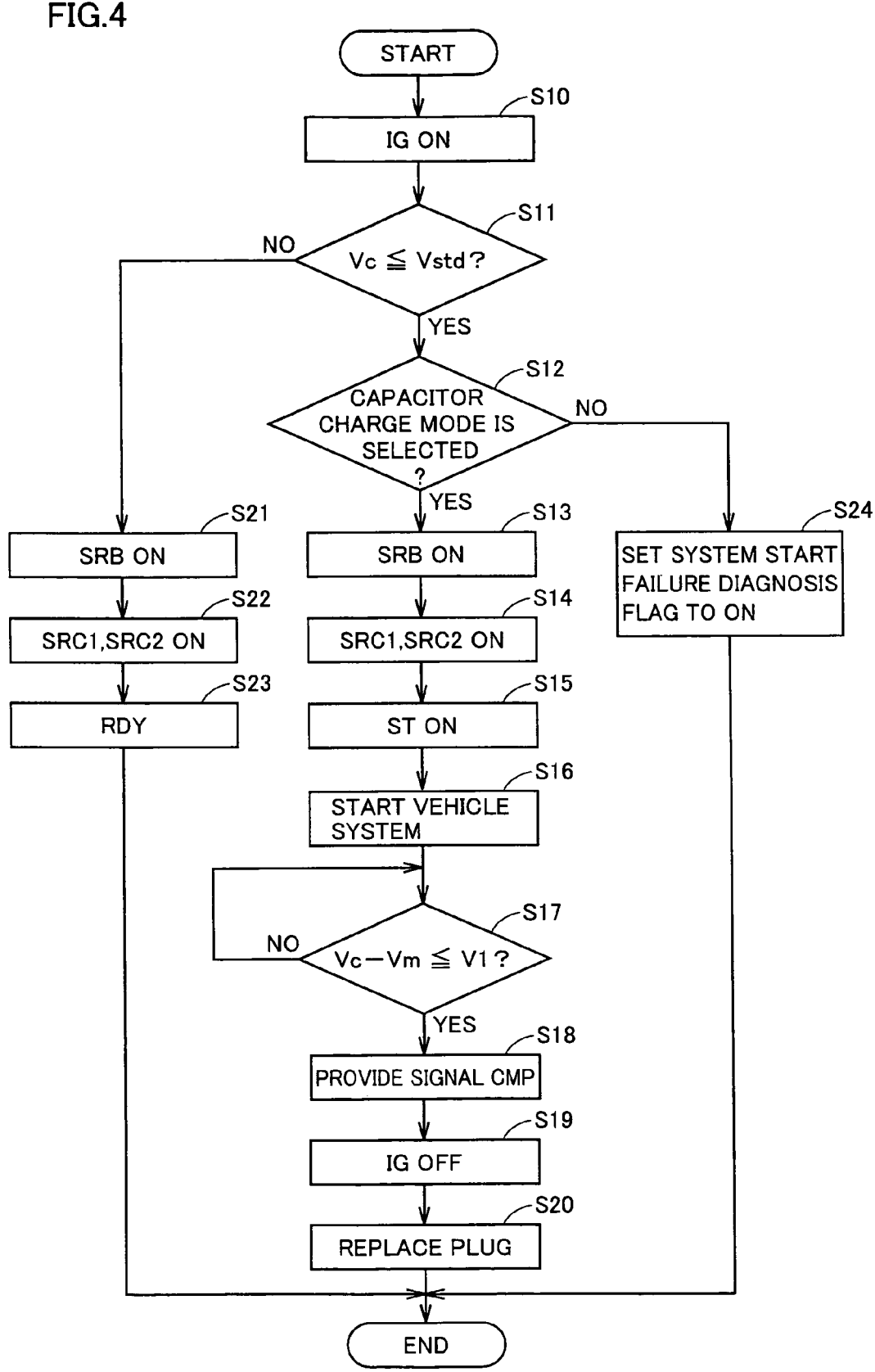
FIG. 4 is a flowchart for illustrating a charge operation of a power storage device according to the embodiment of the invention.

FIG. 4 is a flowchart for illustrating the charge operation of power storage device CA according to the embodiment of the invention.

Referring to FIG. 4, when the ignition key is first turned on (step S10), control device 30 determines whether inter-terminal voltage Vc of power storage device CA sensed by voltage sensor 11 is equal to or lower than a predetermined reference value Vstd, or not (step S11). Predetermined reference value Vstd includes inter-terminal voltage Vc (substantially equal to zero) attained, e.g., when capacitors C1 and C2 are in the overdischarged state.

When it is determined in step S11 that inter-terminal voltage Vc is higher than predetermined reference value Vstd, control device 30 provides signal SEB at the H-level to system relays SRB1-SRB3 on the battery B side to turn on system relays SRB1-SRB3 (step S21).

When battery B at a high voltage is suddenly connected to a load in the above state, a large current, i.e., rush current may instantaneously flows. Therefore, at the start of supply of the electric power, system relays SRB1-SRB3 are turned on/off according to the procedure that prevents the rush current by resistance R1 arranged in system relay SRB1. More specifically, system relays SRB1 and SRB3 are first turned on. Thereby, system relay SRB1 supplies the DC current from battery B to booster converter 12 via resistance R1. Subsequently, system relay SRB2 is turned on while keeping system relays SRB1 and SRB3 on. System relay SRB2 directly supplies the DC current from battery B to booster converter 12. Finally, only system relay SRB1 is turned off.

Then, control device 30 provides signal SEC at the H-level to turn on system relays SRC1 and SRC2 on the power storage device CA side (step S22). The connection of power storage device CA sets the motor drive device to an RDY state that is ready for the start of the system (step S23), and then the motor drive device executes the ordinary system start operation.

When it is determined in step S11 that inter-terminal voltage Vc is equal to or lower than predetermined reference value Vstd, control device 30 determines whether the capacitor charge mode is selected or not (step S12). The determining operation in step S12 is executed according to steps S01-S06 in FIG. 3.

When it is determined in step S12 that the capacitor charge mode is selected, control device 30 provides signal SEB at the H-level to system relays SRB1-SRB3 to turn on system relays SRB1-SRB3 (step S13). System relays SRB1-SRB3 are turned on/off according to the same procedure as that in step S21.

Then, control device 30 provides signal SEC at the H-level to turn on system relays SRC1 and SRC2 on the power storage device CA side (step S14). When signal ST attains the H-level in response to the turn of the ignition key to the start position (step S15), control device 30 executes the vehicle system start operation (step S16).

Thereby, motor generator MG1 receives the electric power from battery B and operates as the electric motor to crank engine ENG. Power storage device CA is charged with DC voltage Vb boosted by booster converter 12. After the start of engine ENG, inverter 14 converts the AC power generated by motor generator MG1 to the DC power, which is then stored in power storage device CA.

Control device 30 continues the charging operation of power storage device CA until a voltage difference between system voltage Vm and inter-terminal voltage Vc of power storage device CA becomes equal to or lower than a predetermined value V1. Finally, control device 30 determines that the voltage difference between system voltage Vm and inter-terminal voltage Vc of power storage device CA becomes equal to or lower than predetermined value V1 (step S17), produces a signal CMP indicating the completion of the charging of power storage device CA and provides it to display means (step S18).

When the operator recognizes the completion of charging of power storage device CA through the display means, the operator turns off the ignition key to stop the vehicle system (step S19), and replaces service plug SVP attached to power storage device CA with ordinary safety plug SFP (step S20). More specifically, the operator removes service plug SVP from socket units 60, 62 and 64 arranged at the outer surface of the casing of power storage device CA, and then fits safety plug SFP to socket units 60, 62 and 64.

Returning to step S12, when it is determined that the capacitor charge mode is not selected, control device 30 inhibits the start of the vehicle system. More specifically, control device 30 sets the diagnosis flag indicating a failure in system start to the on state, and outputs it (step S24).

[Modification]

Finally, a modification of the embodiment of the invention will be described, and particularly description will be given on another example of the operation of determining whether the capacitor charge mode is selected or not.

Figure 5:
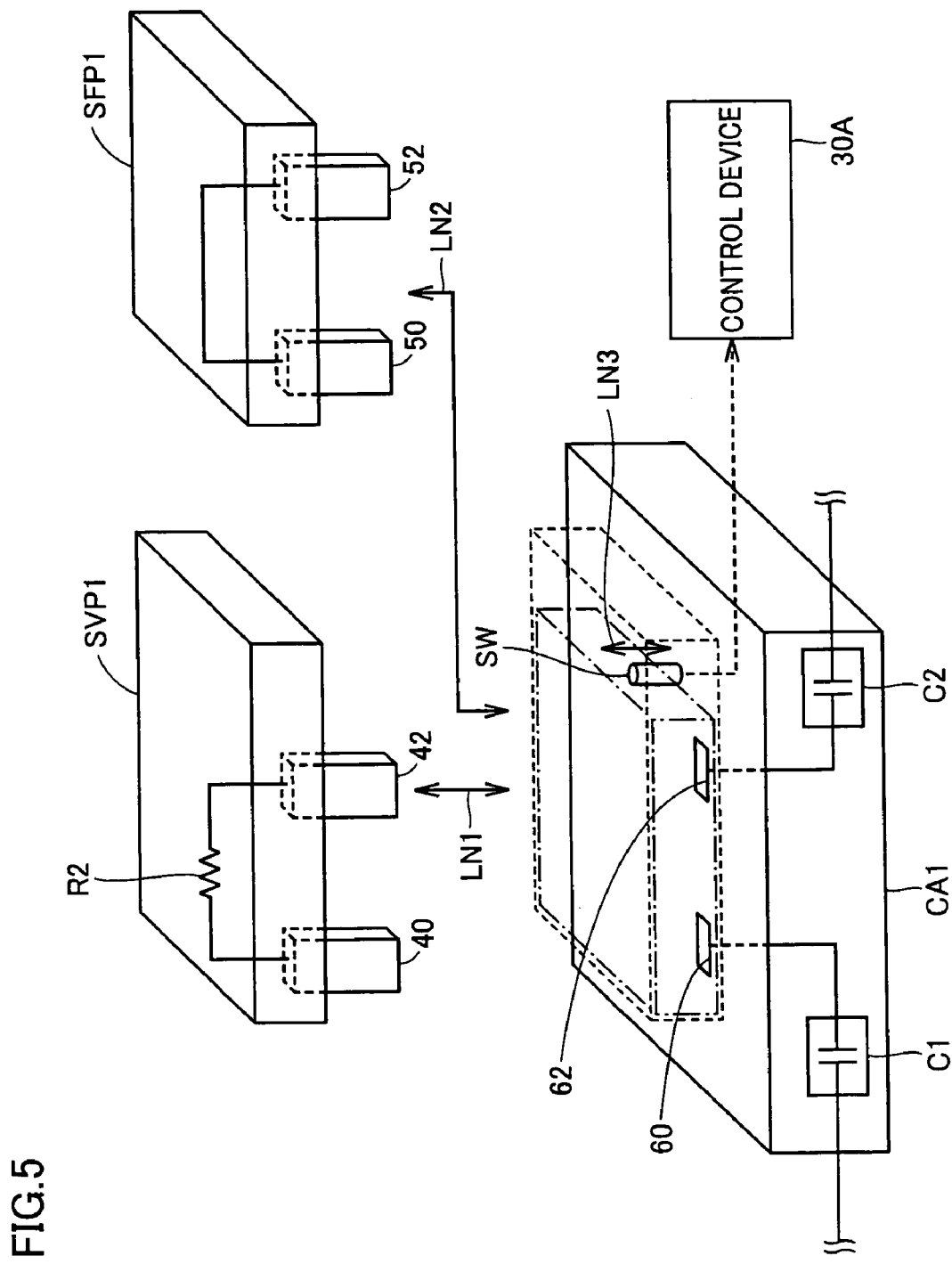
FIG. 5 illustrates specific structures of a service plug, a safety plug and a power storage device according to a modification of the embodiment of the invention.

FIG. 5 is a diagram illustrating specific structures of a service plug SVP1, a safety plug SFP1 and a power storage device CA1 according to a modification of the embodiment of the invention.

Referring to FIG. 5, service plug SVP1 has two plug terminals 40 and 42 protruding from the support member as well as resistance R2.

Plug terminals 40 and 42 are electrically connected together via resistance R2 arranged inside the support member.

Power storage device CA1 is provided at the outer surface of the casing accommodating capacitors C1 and C2 with a push-button switch SW and socket units 60 and 62 corresponding to plug terminals 40 and 42, respectively.

Socket unit 60 is electrically connected to the negative terminal of capacitor C1. Socket unit 62 is electrically connected to a positive terminal of capacitor C2. Socket units 60 and 62 form contacts of relay circuit RL1, respectively. Thereby, when service plug SVP is attached to power storage device CA in the manner indicated by arrow LN1, plug terminals 40 and 42 are fitted to socket units 60 and 62 to close relay circuit RL1. In this state, resistance R2 is connected between the contacts of relay circuit RL1.

While plug terminals 40 and 42 are being fitted to socket units 60 and 62, respectively, the end of push-button switch SW comes into contact with the support member of service plug SVP1 and is moved in a direction of an arrow LN3 so that switch SW is operated (i.e., pushed). Switch SW is electrically connected to a control device 30A, and provide a signal indicating that it is operated to control device 30A.

Safety plug SFP1 has two plug terminals 50 and 52 protruding from the support member, similarly to service plug SVP1. However, resistance R2 is not connected between plug terminals 50 and 52.

Safety plug SFP1 is different from service plug SVP1 in shape of a side surface of the support member on which the plug terminals are arranged.

More specifically, when plug terminals 50 and 52 is fitted to socket units 60 and 62 in the direction of arrow LN2 in FIG. 5, the support member of safety plug SFP1 is not brought into contact with the end of switch SW arranged at the outer surface of the casing of power storage device CA. Therefore, switch SW is not operated when safety plug SFP1 is being attached.

In the above structure, when the maintenance or the like of power storage device CA1 of is to be performed, the residual charges are discharged from capacitors C1 and C2 with safety plug SFP1 attached thereto. The maintenance operation will be performed after inter-terminal voltage Vc of power storage device CA1 is substantially set to zero. After the operation, the operator removes safety plug SFP1 from socket units 60 and 62 arranged at the outer surface of the casing of power storage device CA1, and another service plug SVP1 is fitted to socket units 60 and 62. During this fitting, switch SW arranged at the outer surface of the casing is operated.

When control device 30A receives the signal indicating the operation of switch SW from power storage device CA1, control device 30A determines that the operator selected the capacitor charge mode designating the charge request for power storage device CA. Thus, control device 30A determines the type of the plug attached to power storage device CA1, and thereby determines that the capacitor charge mode is selected. In response to the determination that the capacitor charge mode is selected, control device 30A allows the start of the vehicle system.

Figure 6:
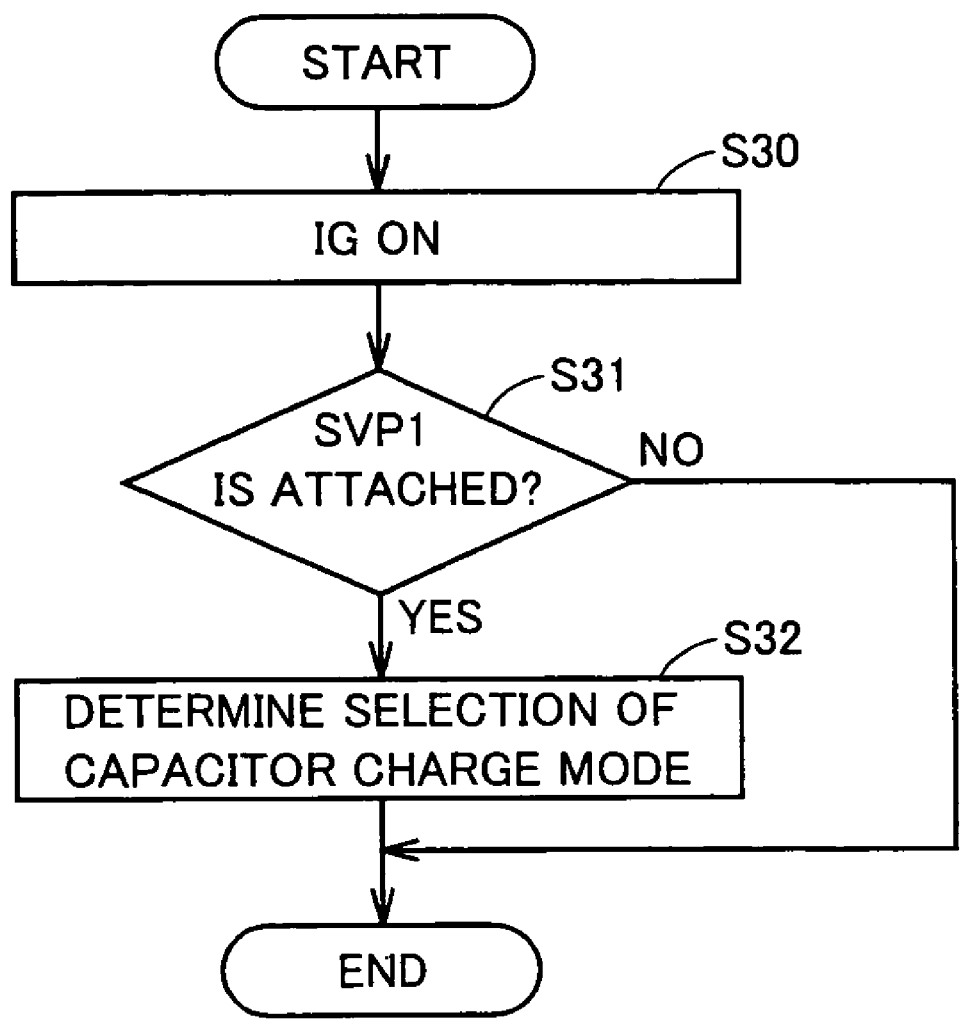
FIG. 6 is a flowchart for illustrating an operation of determining whether the capacitor charge mode according to the modification of the embodiment of the invention is selected or not.

Description will now be given on the operation of determining whether control device 30A has selected the capacitor charge mode or not. FIG. 6 is a flowchart illustrating the operation of determining whether control device 30A has selected the capacitor charge mode or not, according to the modification of the embodiment of the invention.

Referring to FIG. 6, when the ignition key is first turned on (step S30), control device 30A determines whether service plug SVP1 is attached or not, based on the signal provided from power storage device CA1 and indicating the operation of switch SW (step S31).

When control device 30A receives the signal indicating the operation of switch SW in step S31, control device 30A determines that the capacitor charge mode is selected (step S32). When control device 30A does not receive the signal indicating the operation of switch SW, control device 30A determines that the capacitor charge mode is not selected.

According to the invention, as described above, the power storage device in the overdischarged state can be discharged without generating the rush current. Further, the current limiting device of the power storage device is removably attached to the power supply device so that the power supply device can have smaller sizes than a power supply device that internally and permanently has a current limiting device.

The example of the embodiment already described is applied to the series/parallel hybrid vehicle in which the power splitting mechanism can split the power of the engine for transmission to the axle and the electric power generator. However, the invention can be applied to a series-type hybrid vehicle in which an engine is used for driving an electric power generator, and only the motor using the electric power generated by the power generator generates a drive power for an axle(s). Also, the invention can be applied to an electric vehicle that uses only an electric motor for running. In each of these structures, the axle is connected to the electric motor or the power generator, and a regenerative energy in a deceleration operation can be recovered and stored in a battery or a capacitor. Therefore, these structures can employ the invention.

Although the present invention has been described and illustrated in detail, it is clearly understood that the same is by way of illustration and example only and is not to be taken by way of limitation, the scope of the present invention being interpreted by the terms of the appended claims.

INDUSTRIAL APPLICABILITY

The invention can be applied to a power supply device having a power storage device and a power supply that can an electric power to first and second power supply lines, and can also be applied to a control method of the power supply device.

The invention claimed is:

1. A power supply device comprising:
a power supply capable of supplying an electric power to a power supply line;
a drive circuit arranged between said power supply line and a motor for driving and controlling said motor;
a power storage device connected to said power supply line and arranged in parallel to said power supply;
a switch device electrically connecting said power storage device to said power supply line in a closed state; and
a control device controlling an open/close operation of said switch, wherein
said power storage device includes:
a relay circuit arranged to be connected in series to said switch device on a current path being formed of said power supply line and said power storage device when said switch device is closed, and
a first connection member being externally removable, being attached to said relay circuit for connecting contacts of said relay circuit together via a resistance element, and being removed from said relay circuit for disconnecting the contacts of said relay circuit from each other, and
said control device closes said switch device in response to attachment of said first connection member to said relay circuit when a power supply voltage of said power storage device is equal to or lower than a predetermined threshold.

2. The power supply device according to claim 1, wherein said power storage device further includes a second connection member being externally removable, being attached to said relay circuit for directly connecting the contacts of said relay circuit together, and being removed from said relay circuit for disconnecting the contacts of said relay circuit from each other,
said first connection member is attached to said relay circuit after said second connection member is removed from said relay circuit when the power supply voltage of said power storage device is equal to or lower than said predetermined threshold, and
said second connection member is attached to said relay circuit after removal of said first connection member from said relay circuit when the power supply voltage of said power storage device substantially becomes equal to a voltage on said power supply line in response to closing of said switch device.

3. The power supply device according to claim 2, wherein said control device includes a determining unit determining whether said first connection member is attached to said relay circuit or not,
said determining unit includes:
a charge request detecting unit detecting external designation of a charge request for said power storage device, and
a relay circuit detecting unit detecting connection/disconnection between the contacts of said relay circuit, and
said determining unit determines that said first connection member is attached to said relay circuit, when the designation of the charge request for said power storage device is detected and the connection between the contacts of said relay circuit is detected.

4. The power supply device according to claim 2, wherein said power storage device further includes a switch circuit attaining a closed state in response to attachment of said first connection member to said relay circuit,
said control device includes a determining unit determining whether said first connection member is attached to said relay circuit or not, and
said determining unit determines that said first connection member is attached to said relay circuit, when said switch circuit is in a closed state.

5. A control method of a power supply device supplying an electric power to a power supply line, wherein
said power supply device includes:
a power supply capable of supplying an electric power to a power supply line,
a drive circuit arranged between said power supply line and a motor for driving and controlling said motor,
a power storage device connected to said power supply line and arranged in parallel to said power supply, and
a switch device electrically connecting said power storage device to said power supply line in a closed state;
said power storage device includes a relay circuit arranged to be connected in series to said switch device on a current path being formed of said power supply line and said power storage device when said switch device is closed; and
said control method of said power supply device comprises:
a relay circuit control step of connecting contacts of said relay circuit together via a resistance element in response to attachment of said first connection member to said relay circuit; and
a switch control step of closing said switch device in response to the attachment of said first connection member to said relay circuit when a power supply voltage of said power storage device is equal to or lower than a predetermined threshold.

6. The control method of the power supply device according to claim 5, wherein
said relay circuit control step includes the steps of:
disconnecting the contacts of said relay circuit from each other in response to removable of said second connection member from said relay circuit when the power supply voltage of said power storage device is equal to or lower than said predetermined threshold;
connecting the contacts of said relay circuit together via said resistance element in response to attachment of said first connection member to said relay circuit after said second connection member is removed from said relay circuit;
disconnecting the contacts of said relay circuit from each other in response to removal of said first connection member from said relay circuit when the power supply voltage of said power storage device substantially becomes equal to a voltage on said power supply line in response to closing of said switch device; and directly connecting the contacts of said relay circuit together in response to attachment of said second connection member to said relay circuit after said first connection member is removed from said relay circuit.

7. The control method of the power supply device according to claim 6, wherein said switch control step includes a determining step of determining whether said first connection member is attached to said relay circuit or not; and said determining step includes:

a charge request detecting step of detecting external designation of a charge request for said power storage device, a relay circuit detecting step of detecting connection/disconnection between the contacts of said relay circuit, and a step of determining that said first connection member is attached to said relay circuit, when the designation of the charge request for said power storage device is detected and the connection between the contacts of said relay circuit is detected.

8. The control method of the power supply device according to claim 6, wherein said power storage device further includes a switch circuit attaining a closed state in response to attachment of said first connection member to said relay circuit, said switch control step includes a determining step of determining whether said first connection member is attached to said relay circuit or not, and said determining step determines that said first connection member is attached to said relay circuit, when said switch circuit is in a closed state.

* * * * *